United States Patent [19]
Anthes et al.

[11] Patent Number: 5,609,012
[45] Date of Patent: Mar. 11, 1997

[54] RAKING APPARATUS WORN ON A HAND

[76] Inventors: Peter S. Anthes; Jeanne Anthes, both of 8 Gem Ct., Westerly, R.I. 02891

[21] Appl. No.: 529,081

[22] Filed: Sep. 15, 1995

[51] Int. Cl.$^6$ ...................................................... A01D 7/06
[52] U.S. Cl. .................................. 56/400.01; 56/400.12; 172/378
[58] Field of Search ......................... 56/400.01, 400.04, 56/400.19, 400.12, 400.21; 172/378; 294/25

[56] References Cited

U.S. PATENT DOCUMENTS

| | | | |
|---|---|---|---|
| 4,378,670 | 4/1983 | Check et al. ......................... | 56/400.01 |
| 4,866,922 | 9/1989 | Clark ..................................... | 56/400.04 |
| 5,404,644 | 4/1995 | Needham et al. .................... | 172/378 X |

*Primary Examiner*—Terry Lee Melius

[57] ABSTRACT

A raking apparatus worn on a hand comprised of a plurality of L-shaped rake portions. The plurality of rake portions are coupled together by an arcuate support rod. A palm receiving portion is secured to end portions of the plurality of L-shaped rake portions. A finger receiving portion is secured to the plurality of L-shaped rake portions adjacent to the palm receiving portion.

5 Claims, 3 Drawing Sheets

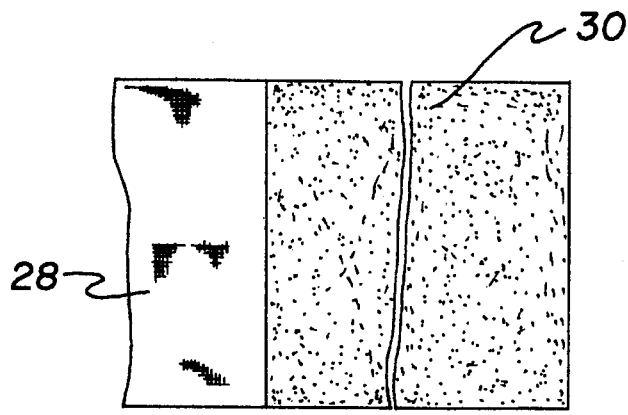
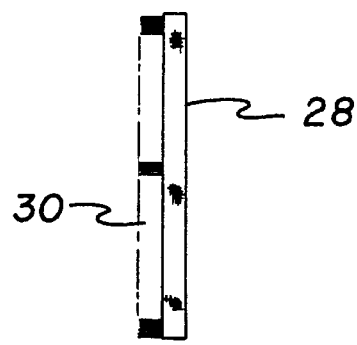
FIG. 4A          FIG. 4B
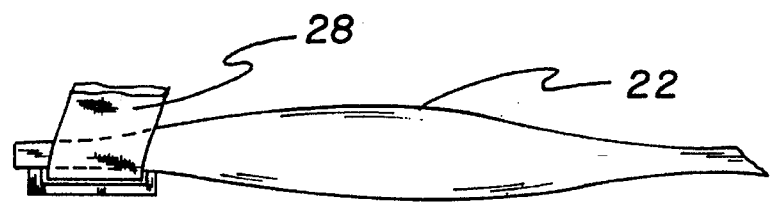
FIG. 5
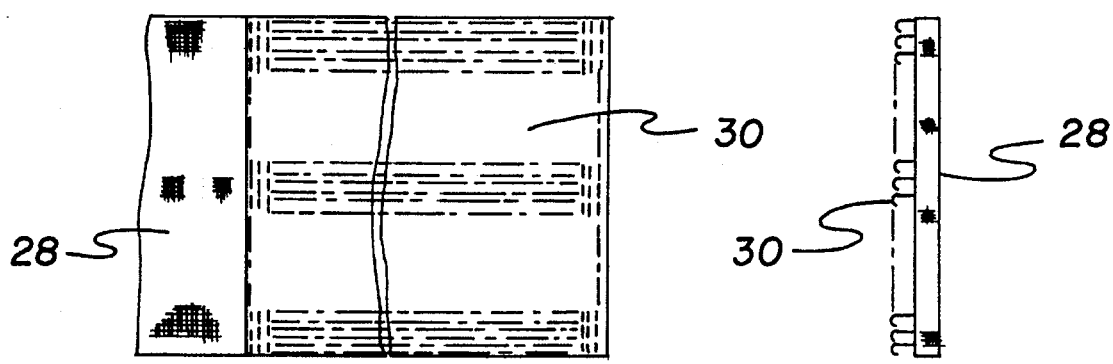
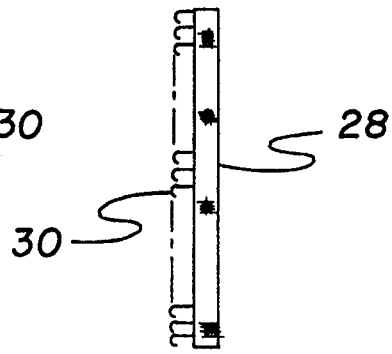
FIG. 6A          FIG. 6B

RAKING APPARATUS WORN ON A HAND

BACKGROUND OF THE INVENTION

1. Field of the Invention

The present invention relates to a raking apparatus worn on a hand and more particularly pertains to gathering up leaves and debris without the need for long-handed rakes with a raking apparatus worn on a hand.

2. Description of the Prior Art

The use of glove tools is known in the prior art. More specifically, glove tools heretofore devised and utilized for the purpose of providing hand worn tools are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,014,792 to Gierloff discloses a garden glove tool.

U.S. Pat. No. 4,203,495 to Crownover discloses a glove and tool device with two tool elements.

U.S. Pat. No. 4,149,601 to Taylor discloses a cultivator glove.

U.S. Pat. No. 4,089,379 to Crownover discloses a glove and tool device.

U.S. Pat. No. 3,802,302 to Bengston discloses a tool holding prosthetic device.

U.S. Pat. No. 3,232,355 to Woolworth discloses a garden tool handle.

While these devices fulfill their respective, particular objective and requirements, the aforementioned patents do not describe a raking apparatus worn on a hand for gathering up leaves and debris without the need for Long-handed rakes.

In this respect, the raking apparatus worn on a hand according to the present invention substantially departs from the conventional concepts and designs of the prior art, and in doing so provides an apparatus primarily developed for the purpose of gathering up leaves and debris without the need for long-handed rakes.

Therefore, it can be appreciated that there exists a continuing need for new and improved raking apparatus worn on a hand which can be used for gathering up leaves and debris without the need for long-handed rakes. In this regard, the present invention substantially fulfills this need.

SUMMARY OF THE INVENTION

In the view of the foregoing disadvantages inherent in the known types of glove tools now present in the prior art, the present invention provides an improved raking apparatus worn on a hand. As such, the general purpose of the present invention, which will be described subsequently in greater detail, is to provide a new and improved raking apparatus worn on a hand and method which has all the advantages of the prior art and none of the disadvantages.

To attain this, the present invention essentially comprises a plurality of L-shaped rake portions. Each of the L-shaped rake portions has a first extent and a second extent. The second extent extends downwardly nearly perpendicular to the second extent. The plurality of rake portions are coupled together by an arcuate support rod extending along the first extents thereof. Next, the device includes a palm receiving portion having an open first end and an open second end. A lower portion of the open first end is secured to end portions of the plurality of L-shaped rake portions. The open second end is dimensioned to receive a user's hand therein. The palm receiving portion has a pair of securement straps extending from opposing sides of a lower surface thereof to wrap around a user's hand. The securement straps have cooperating hook and loop fasteners thereon for securement around a hand. The palm receiving portion has a thumb resting portion extending from a side portion thereof. Additionally, the device includes a finger receiving portion secured to the first extents of the plurality of L-shaped rake portions adjacent to the open first end of the palm receiving portion. The finger receiving portion comprises four curved portions forming openings for receipt of a user's fingers therethrough. Four finger rest portions are secured to the first extents of the plurality of L-shaped rake portions upwardly of the finger receiving portion. The finger rest portions comprise four small curved oval pads for receipt of a user's fingertips to rest thereon.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved raking apparatus worn on a hand which has all the advantages of the prior art glove tools and none of the disadvantages.

It is another object of the present invention to provide a new and improved raking apparatus worn on a hand which may be easily and efficiently manufactured and marketed.

It is a further object of the present invention to provide a new and improved raking apparatus worn on a hand which is of durable and reliable construction.

An even further object of the present invention is to provide a new and improved raking apparatus worn on a hand which is susceptible of a low cost of manufacture with regard to both materials and labor, and which accordingly is then susceptible of low prices of sale to the consuming public, thereby making such a raking apparatus worn on a hand economically available to the buying public.

Still yet another object of the present invention is to provide a new and improved raking apparatus worn on a hand which provides in the apparatuses and methods of the prior art some of the advantages thereof, while simultaneously overcoming some of the disadvantages normally associated therewith.

Even still another object of the present invention is to provide a new and improved raking apparatus worn on a hand for gathering up leaves and debris without the need for long-handed rakes.

Lastly, it is an object of the present invention to provide a new and improved raking apparatus worn on a hand comprised of a plurality of L-shaped rake portions. The plurality of rake portions are coupled together by an arcuate support rod. A palm receiving portion is secured to end portions of the plurality of L-shaped rake portions. A finger receiving portion is secured to the plurality of L-shaped rake portions adjacent to the palm receiving portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4A and 4B are an enlarged view of the securement strap of the present invention.

FIG. 5 is a cross-sectional view as taken along line 5—5 of FIG. 2.

FIG. 6A and 6B are an enlarged view of the securement strap of the present invention.

The same reference numerals refer to the same parts through the various Figures.

DESCRIPTION OF THE PREFERRED EMBODIMENT

Figure 1:
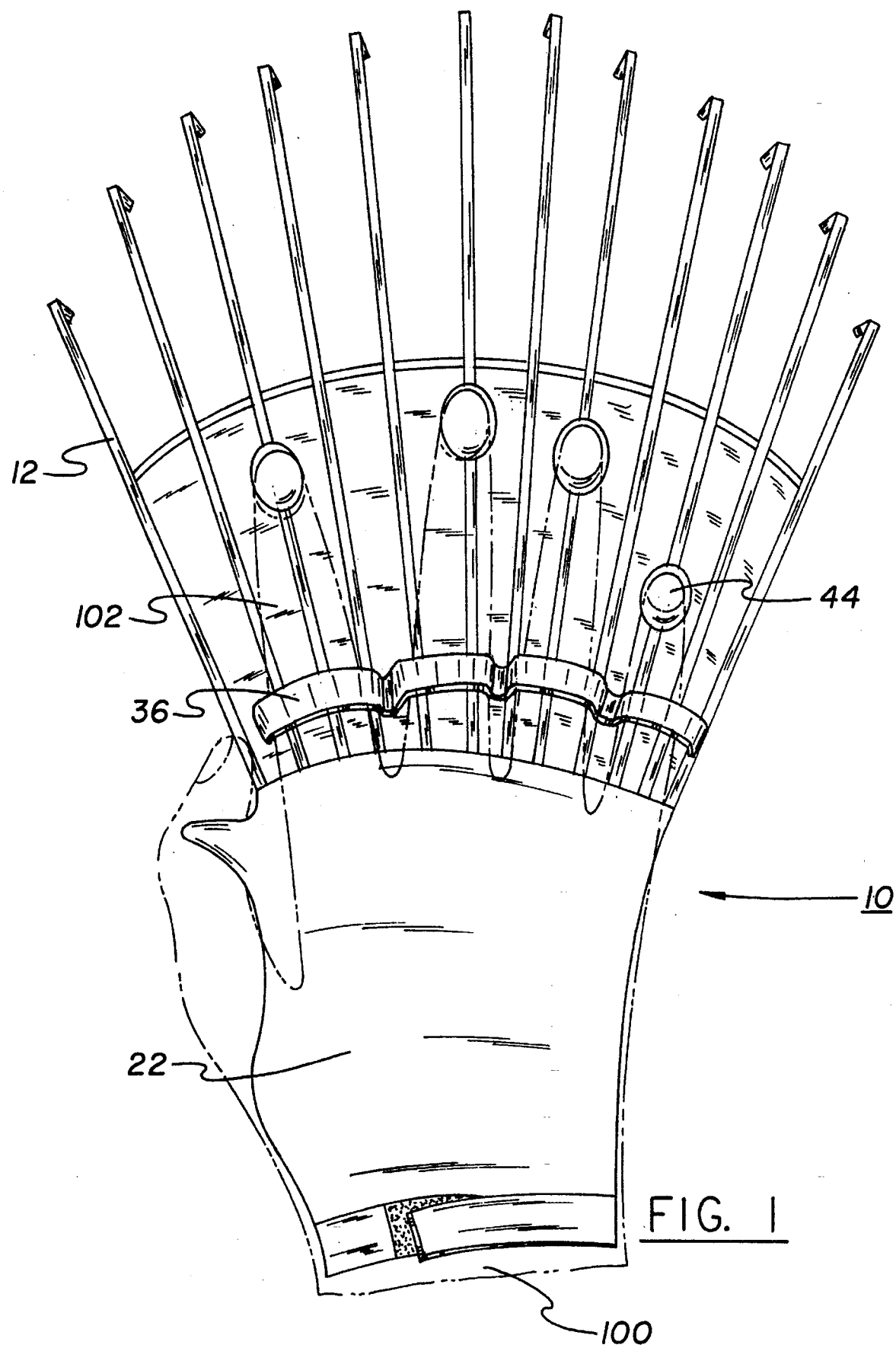
FIG. 1 is a plan view of the preferred embodiment of the raking apparatus worn on a hand constructed in accordance with the principles of the present invention.
Figure 2:
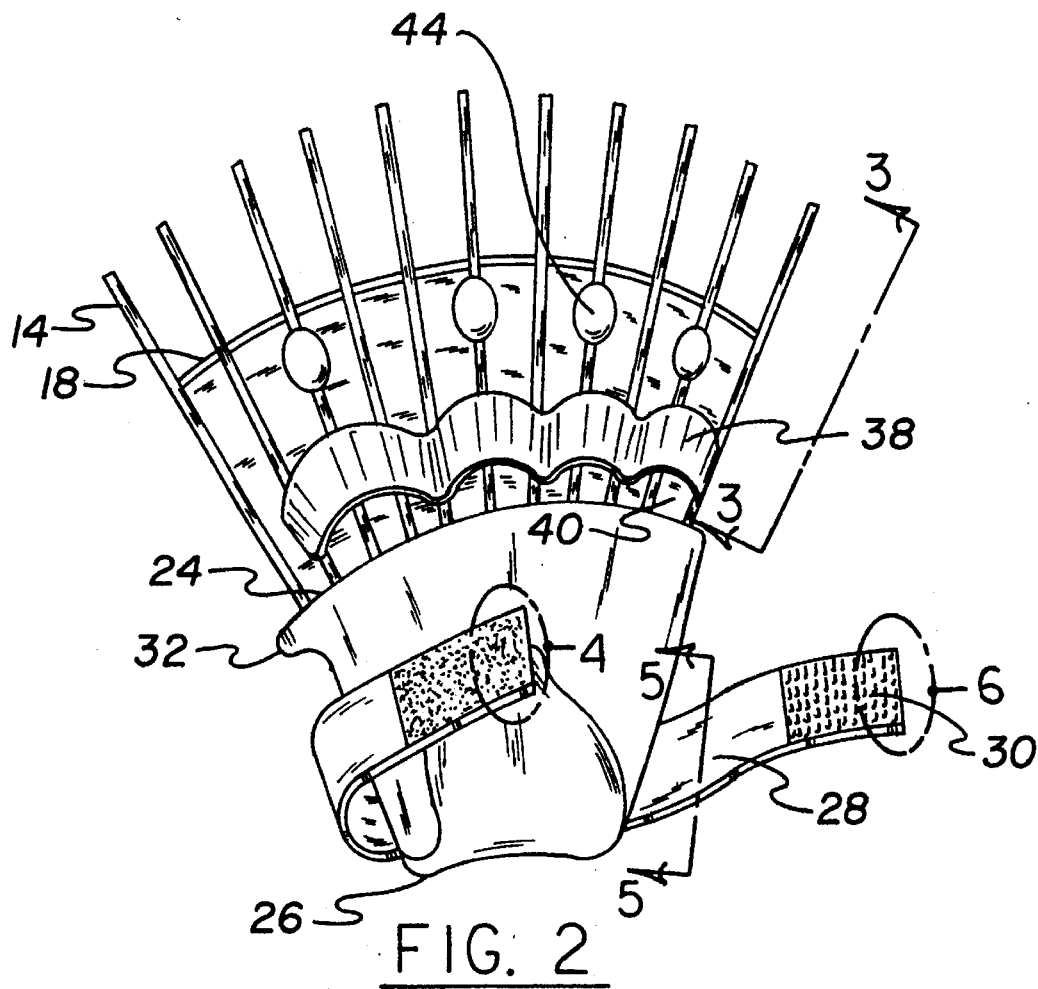
FIG. 2 is a plan view of the present invention illustrating the securement straps.
Figure 3:
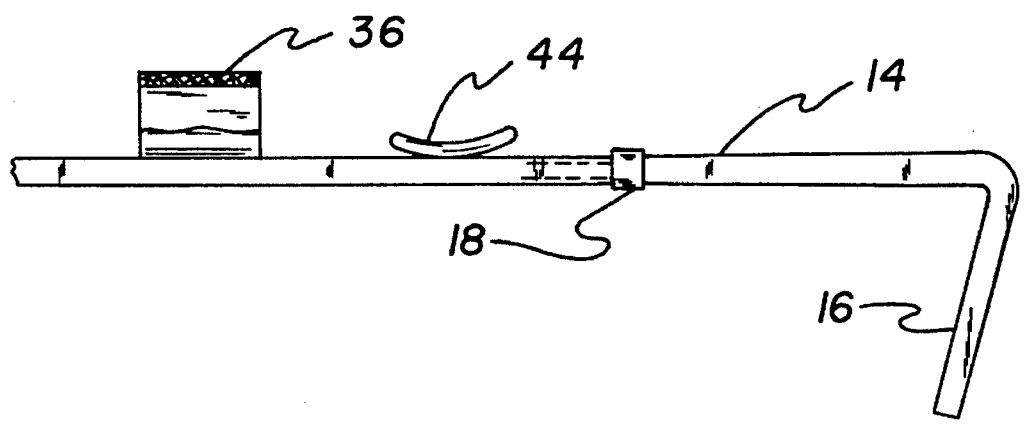
FIG. 3 is a cross-sectional view as taken along line 3—3 of FIG. 2.

With reference now to the drawings, and in particular, to FIG. 1–6 thereof, the preferred embodiment of the new and improved raking apparatus worn on a hand embodying the principles and concepts of the present invention and generally designated by the reference number 10 will be described.

Specifically, it will be noted in the various Figures that the device relates to a new and improved raking apparatus worn on a hand for gathering up leaves and debris without the need for long-handed rakes. In its broadest context, the device consists of a plurality of L-shaped rake portions, a palm receiving portion, a finger receiving portion, and four finger rest portions. Such components are individually configured and correlated with respect to each other so as to attain the desired objective.

The device 10 is comprised of a plurality of L-shaped rake portions 12. Each of the L-shaped rake portions 12 has a first extent 14 and a second extent 16. The second extent 16 extends downwardly nearly perpendicular to the first extent 14. This arrangement allows for a user to properly rake an area by enabling the angled second extent 16 to pull leaves and debris towards the user. The plurality of rake portions 12 are coupled together by an arcuate support rod 18 extending along the first extents 14 thereof. The arcuate support rod 18 configures the plurality of rake portions 12 in a rake type arrangement.

Next, the device 10 includes a palm receiving portion 22 having an open first end 24 and an open second end 26. A lower portion of the open first end 24 is secured to end portions of the plurality of L-shaped rake portions 12. The open second end 26 is dimensioned to receive a user's hand 100 therein. The palm receiving portion 22 has a pair of securement straps 28 extending from opposing sides of a lower surface thereof to wrap around a user's hand 100. The securement straps 28 have cooperating hook and loop fasteners 30 thereon for securement around a hand 100. The palm receiving portion 22 has a thumb resting portion 32 extending from a side portion thereof. Once a user's hand 100 is inserted into the palm receiving portion 22, their thumb can be positioned under or over the thumb resting portion 32. The palm receiving portion 22 is conformed to properly fit the user's hand. Different sizes could be fabricated to accommodate different sized hands.

Additionally, the device 10 includes a finger receiving portion 36 secured to the first extents 14 of the plurality of L-shaped rake portions 12 adjacent to the open first end 24 of the palm receiving portion 22. The finger receiving portion 36 comprises four curved portions 38 forming openings 40 for receipt of a user's fingers 102 therethrough.

Lastly, four finger rest portions 44 are secured to the first extents 14 of the plurality of L-shaped rake portions 12 upwardly of the finger receiving portion 36. The finger rest portions 44 comprise four small curved oval pads for receipt of a user's fingertips to rest thereon. Different sized finger rest portions 44 could be used to accommodate the different sizes of fingers on an individuals hand.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A raking apparatus worn on a hand for gathering up leaves and debris without the need for long-handed rakes comprising, in combination:

a plurality of L-shaped rake portions, each of the L-shaped rake portions having a first extent and a second extent, the second extent extending downwardly nearly perpendicular to the first extent, the plurality of rake portions coupled together by an arcuate support rod extending along the first extents thereof;

a palm receiving portion having an open first end and an open second end, a lower portion of the open first end secured to end portions of the plurality of L-shaped rake portions, the open second end dimensioned to receive a user's hand therein, the palm receiving portion having a pair of securement straps extending from opposing sides of a lower surface thereof to wrap around a user's hand, the securement straps having cooperating hook and loop fasteners therein for securement around a hand, the palm receiving portion having a thumb resting portion extending from a side portion thereof;

a finger receiving portion secured to the first extents of the plurality of L-shaped rake portions adjacent to the open first end of the palm receiving portion, the finger receiving portion comprising four curved portions forming openings for receipt of a user's fingers therethrough; and four finger rest portions secured to the first extents of the plurality of L-shaped rake portions upwardly of the finger receiving portion, the finger rest portions comprising four small curved oval pads for receipt of a user's fingertips to rest thereon.

2. A raking apparatus worn on a hand comprising, in combination:

a plurality of L-shaped rake portions, the plurality of rake portions coupled together by an arcuate support rod;

a palm receiving portion secured to end portions of the plurality of L-shaped rake portions;

a finger receiving portion secured to the plurality of L-shaped rake portions adjacent to the palm receiving portion; and four finger rest portions secured to the plurality of L-shaped rake portions upwardly of the finger receiving portion, the finger rest portions comprising four small curved oval pads for receipt of a user's fingertips to rest thereon.

3. The apparatus as set forth in claim 2 wherein each of the L-shaped rake portions having a first extent and a second extent, the second extent extending downwardly nearly perpendicular to the second extent.

4. The apparatus as set forth in claim 2 wherein the palm receiving portion having an open first end and an open second end, a lower portion of the open first end secured to end portions of the plurality of L-shaped rake portions, the open second end dimensioned to receive a user's hand therein, the palm receiving portion having a pair of securement straps extending form opposing sides of a lower surface thereof to wrap around a user's hand, the securement straps having cooperating hook and loop fasteners therein for securement around a hand, the palm receiving portion having a thumb resting portion extending from a side portion thereof.

5. The apparatus as set forth in claim 2 wherein the finger receiving portion comprising four curved portions forming openings for receipt of a user's fingers therethrough.

* * * * *